US011927436B2

(12) United States Patent
Llinas et al.

(10) Patent No.: US 11,927,436 B2
(45) Date of Patent: Mar. 12, 2024

(54) MEASUREMENT MACHINE AND METHOD FOR DETECTING A DEFECT IN SOLDER JOINTS

(71) Applicant: HEWLETT PACKARD ENTERPRISE DEVELOPMENT LP, Houston, TX (US)

(72) Inventors: Jaime E. Llinas, Houston, TX (US); Saravanan Rathakrishnan, Putrajaya (MY); Yanyan Xia, Shanghai (CN); ZeLin Wu, Shanghai (CN); Yanli Li, TianJin (CN); JunHui Li, Shanghai (CN); Jian Miremadi, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 387 days.

(21) Appl. No.: 17/404,097

(22) Filed: Aug. 17, 2021

(65) Prior Publication Data
US 2023/0059410 A1    Feb. 23, 2023

(51) Int. Cl.
*G01B 15/00* (2006.01)
*G01B 9/04* (2006.01)
(Continued)

(52) U.S. Cl.
CPC .............. *G01B 15/00* (2013.01); *G01B 9/04* (2013.01); *G01B 11/02* (2013.01); *G01N 21/956* (2013.01);
(Continued)

(58) Field of Classification Search
CPC ...... G01B 11/02; G01B 15/00; G01B 21/042; G01B 9/04; G01N 2021/95638; G01N 2021/95669; G01N 21/956
See application file for complete search history.

(56) References Cited
U.S. PATENT DOCUMENTS 5,064,291 A * 11/1991 Reiser ................ H05K 13/0817
356/601
7,492,449 B2   2/2009 Ume et al.
(Continued)

FOREIGN PATENT DOCUMENTS

WO    WO-2017041965 A1    3/2017

OTHER PUBLICATIONS

Cadence PCB Solutions, "Why Solder Joint Inspection is Important," retrieved online May 11, 2021, https://resources.pcb.cadence.com/blog/2020-why-solder-joint-inspection-is-important.

*Primary Examiner* — Mark R Gaworecki
(74) *Attorney, Agent, or Firm* — Hewlett Packard Enterprise Patent Department

(57) ABSTRACT

Example implementations relate to an inspection method for training a measurement machine to accurately measure side joint lengths and detecting a defect among a plurality of solder joints. The method includes receiving a first data representing the side joint lengths of the plurality of solder joints measured by a first measurement machine and a second data representing the side joint lengths measured by a second measurement machine. Further, the method includes determining a correlation value based on a statistical analysis of a relationship between the first data and the second data. The method further includes updating an algorithm used by the first measurement machine to measure the side joint lengths, based on the correlation value to reduce deviation between the first data and the second data. Later, the updated algorithm is used as a dimensional metrology in the first measurement machine for detecting the defect in the solder joints.

20 Claims, 7 Drawing Sheets

(51) Int. Cl.
  *G01B 11/02* (2006.01)
  *G01N 21/956* (2006.01)
  *G01B 21/04* (2006.01)

(52) U.S. Cl.
  CPC .. *G01B 21/042* (2013.01); *G01N 2021/95638* (2013.01); *G01N 2021/95669* (2013.01)

(56) References Cited

U.S. PATENT DOCUMENTS

| | | |
|---|---|---|
| 8,661,905 B2 | 3/2014 | Ume et al. |
| 8,714,015 B2 | 5/2014 | Matsui et al. |
| 8,760,665 B2 | 6/2014 | Ume et al. |
| 8,860,456 B2 | 10/2014 | Huang et al. |
| 2003/0114996 A1* | 6/2003 | Ragland ............. G01R 31/2812 702/35 |
| 2021/0010954 A1* | 1/2021 | Adler ................... H05K 1/115 |
| 2022/0023977 A1* | 1/2022 | Cheng ................. G06T 7/0004 |

\* cited by examiner

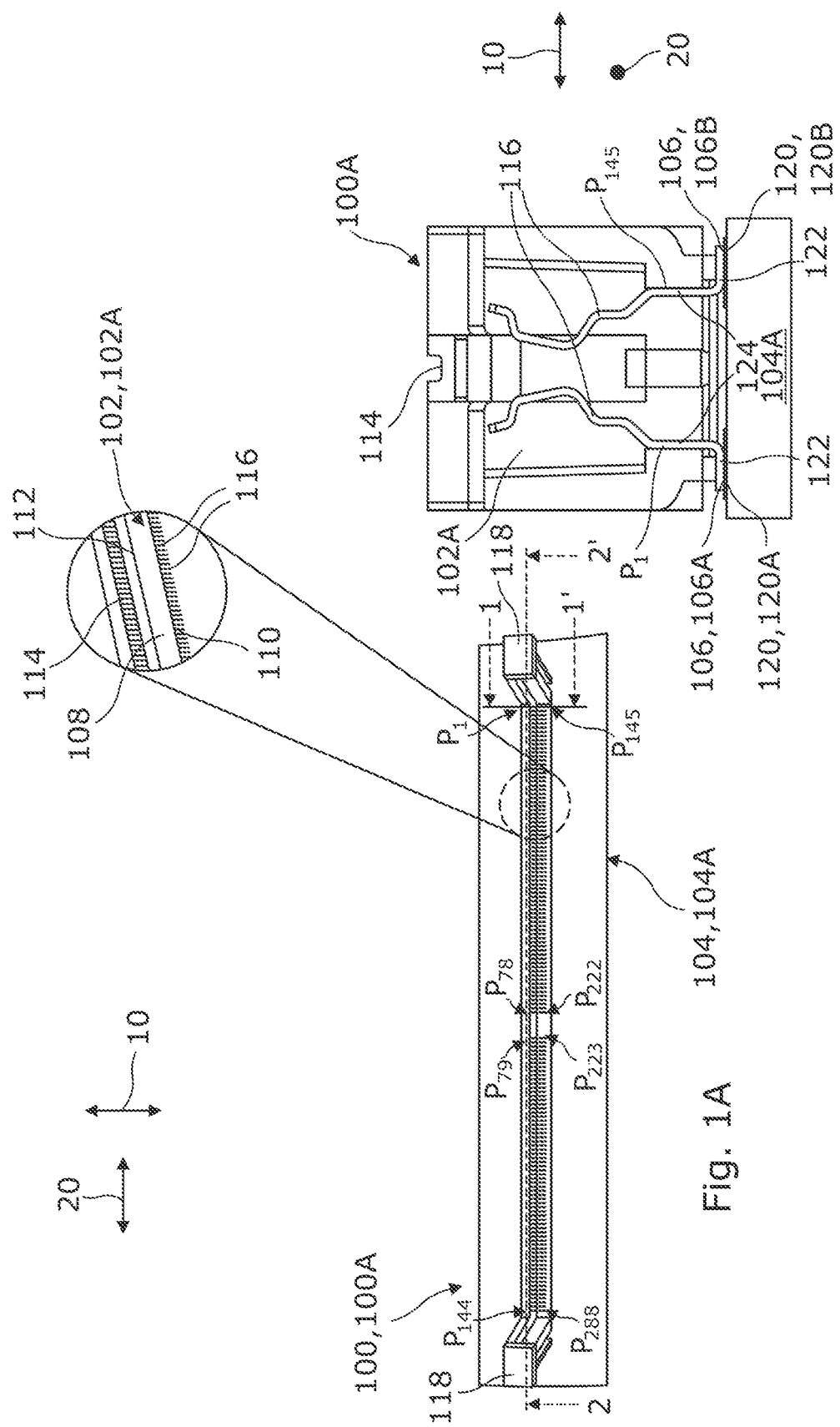

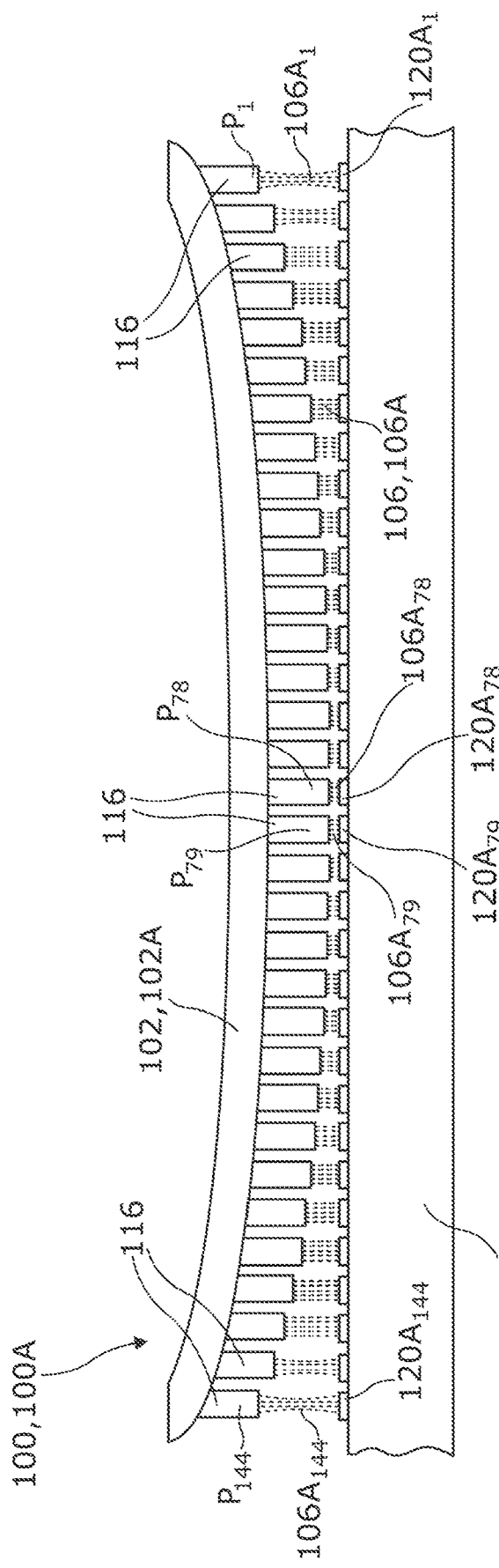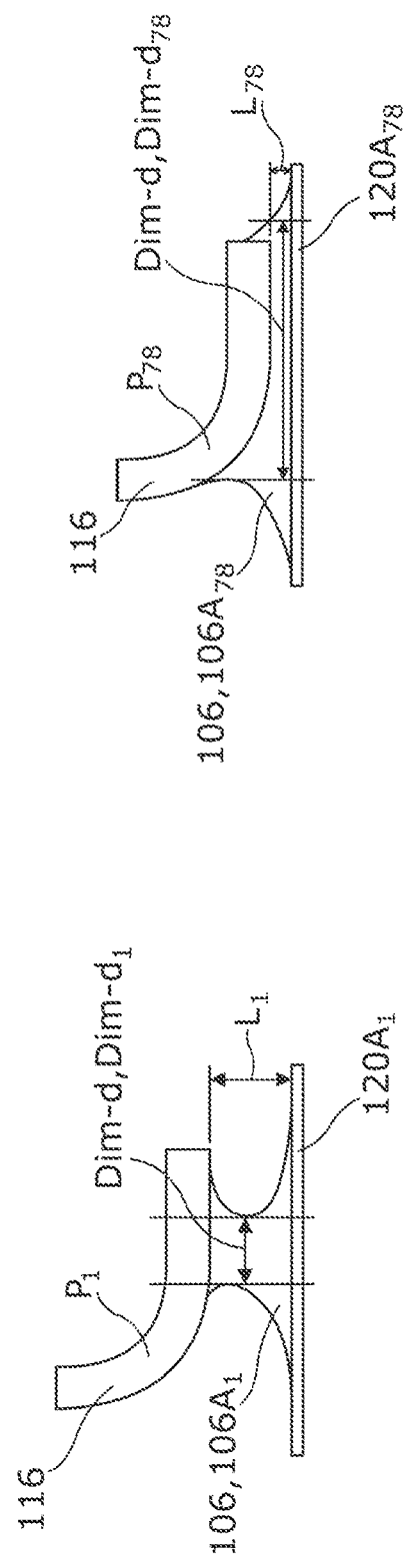

MEASUREMENT MACHINE AND METHOD FOR DETECTING A DEFECT IN SOLDER JOINTS

BACKGROUND

An electronic device, for example, a computing device may include electronic components and boards, where the electronic components are typically connected to the electronic boards by soldering. Typically, the electronic components, such as a socket, includes multiple solder leads that connect with the electronic boards, such as a printed circuit board (PCB), for power and signal distribution there between. Generally, a plated through-hole technique or a surface mount technology is used to connect the electronic component to the electronic board.

BRIEF DESCRIPTION OF THE DRAWINGS

Various examples will be described below with reference to the following figures.

FIG. 1A illustrates a perspective view of a portion of the electronic device having an electronic component and an electronic board according to an example implementation of the present disclosure.

FIG. 1B illustrates a cross-sectional side view of the portion of the electronic device taken along line 1-1' in FIG. 1A according to an example implementation of the present disclosure.

FIG. 2A is a block diagram depicting a cross-sectional front view of a portion of an electronic device according to an example implementation of the present disclosure.

FIG. 2B is a block diagram depicting a cross-sectional side view of one solder joint in the electronic device of FIG. 2A according to an example implementation of the present disclosure.

FIG. 2C is a block diagram depicting a cross-sectional side view of another solder joint in the electronic device of FIG. 2A according to an example implementation of the present disclosure.

Figures 3A, 3B:
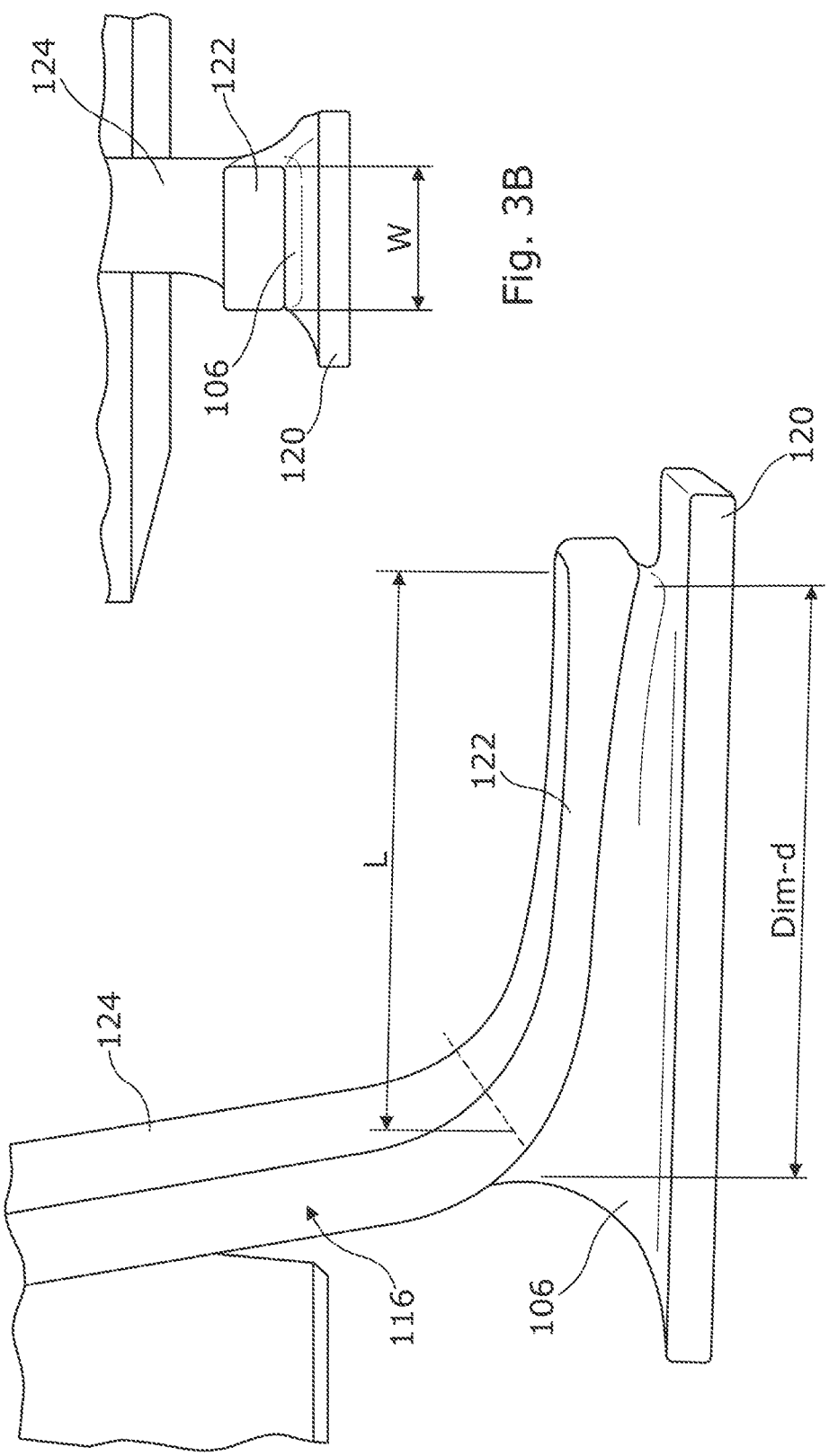
FIG. 3A illustrates a perspective side view of a solder joint according to an example implementation of the present disclosure.
FIG. 3B illustrates a perspective front view of a solder joint according to an example implementation of the present disclosure.

Throughout the drawings, identical reference numbers may designate similar, but not necessarily identical, elements. An index number "N" appended to some of the reference numerals denotes a plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As used herein, the term "solder joint" may refer to a thermally and/or electrically conductive interconnecting element formed between a solder lead of an electronic component and a surface of an electronic board. As used herein, the term "side joint" may refer to a solder joint portion extended along a length of a solder lead foot. As used herein, the term "side joint length" or "solder joint side length" may refer to a length of the solder joint measured along the length of the solder lead foot. As used herein, the term "dimensional metrology" may refer to a science of measurement employed in a measurement machine by calibrating (or training) the measurement machine to determine at least one of a physical size, distance from an object, or length of the object/element. The term "calibrating the measurement machine" may refer to a measuring equipment having an updated algorithm for accurately measuring the side joint lengths of the solder joints, and detecting the defects in the solder joints based on the measured side joint lengths.

Figure 5B:
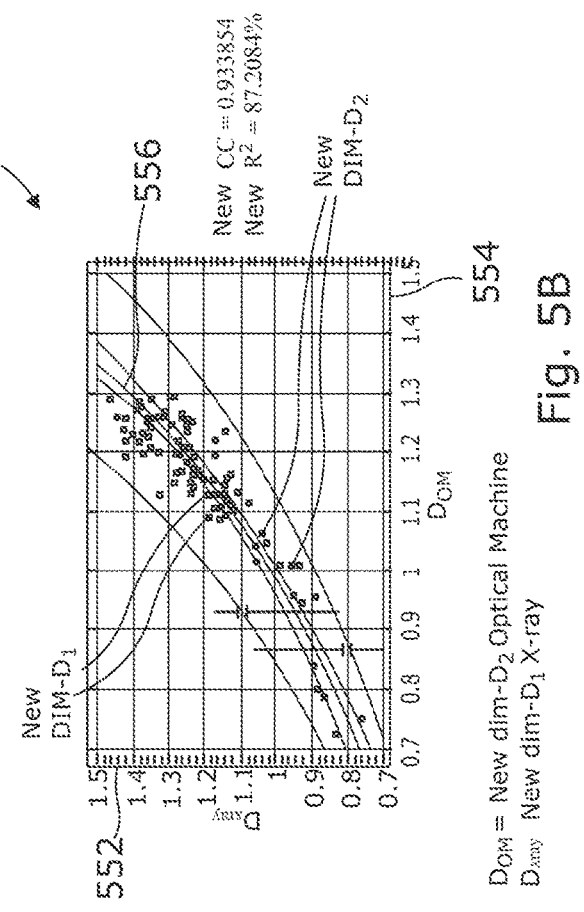
FIG. 5B illustrates a graph representing a new correlation based on a statistical analysis of relationship between another set of first and second data obtained from a first measurement machine, and a second measurement machine respectively, according to an example implementation of the present disclosure.
Figure 5A:
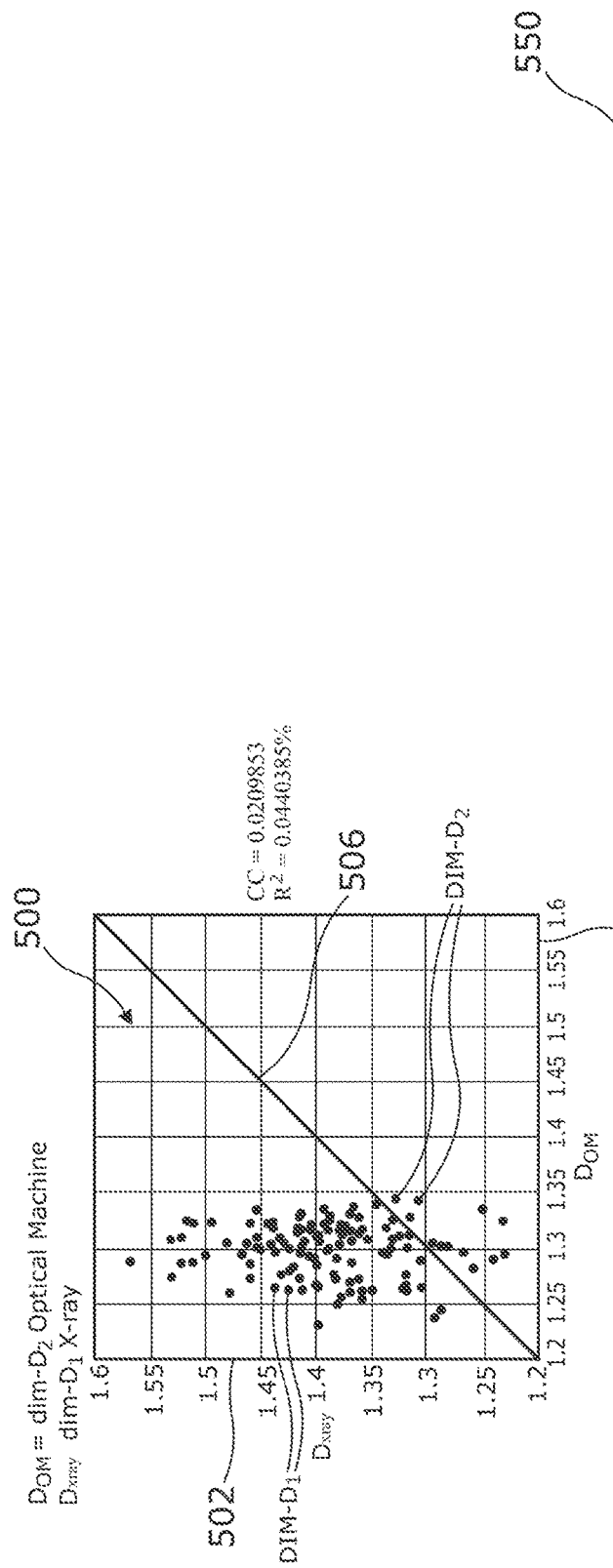
FIG. 5A illustrates a graph representing a correlation based on a statistical analysis of relationship between one set of first and second data obtained from a first measurement machine, and a second measurement machine respectively, according to an example implementation of the present disclosure.
Figure 6:
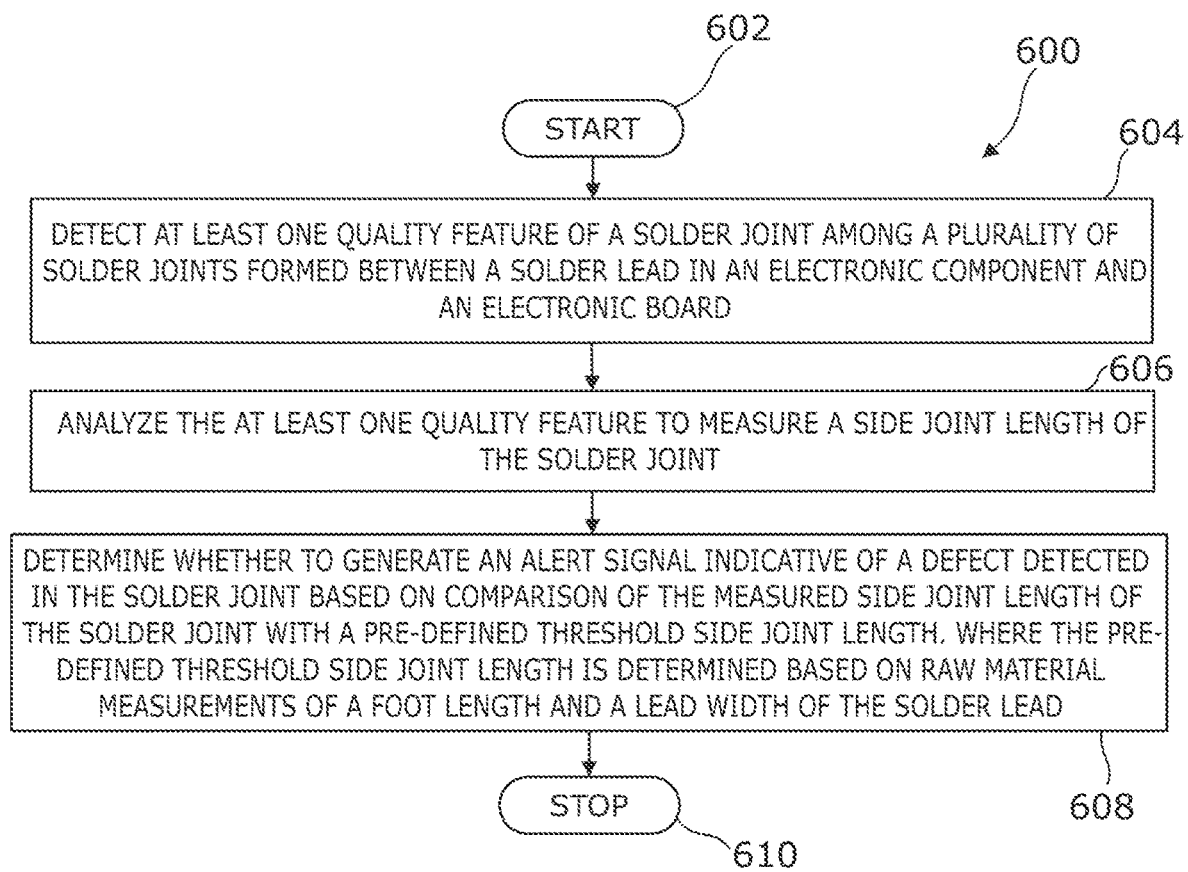
FIG. 6 is a flow diagram depicting a method of detecting a defect in solder joints based on a measured side joint lengths of the solder joints, by using a measurement machine according to an example implementation of the present disclosure.
Figure 7:
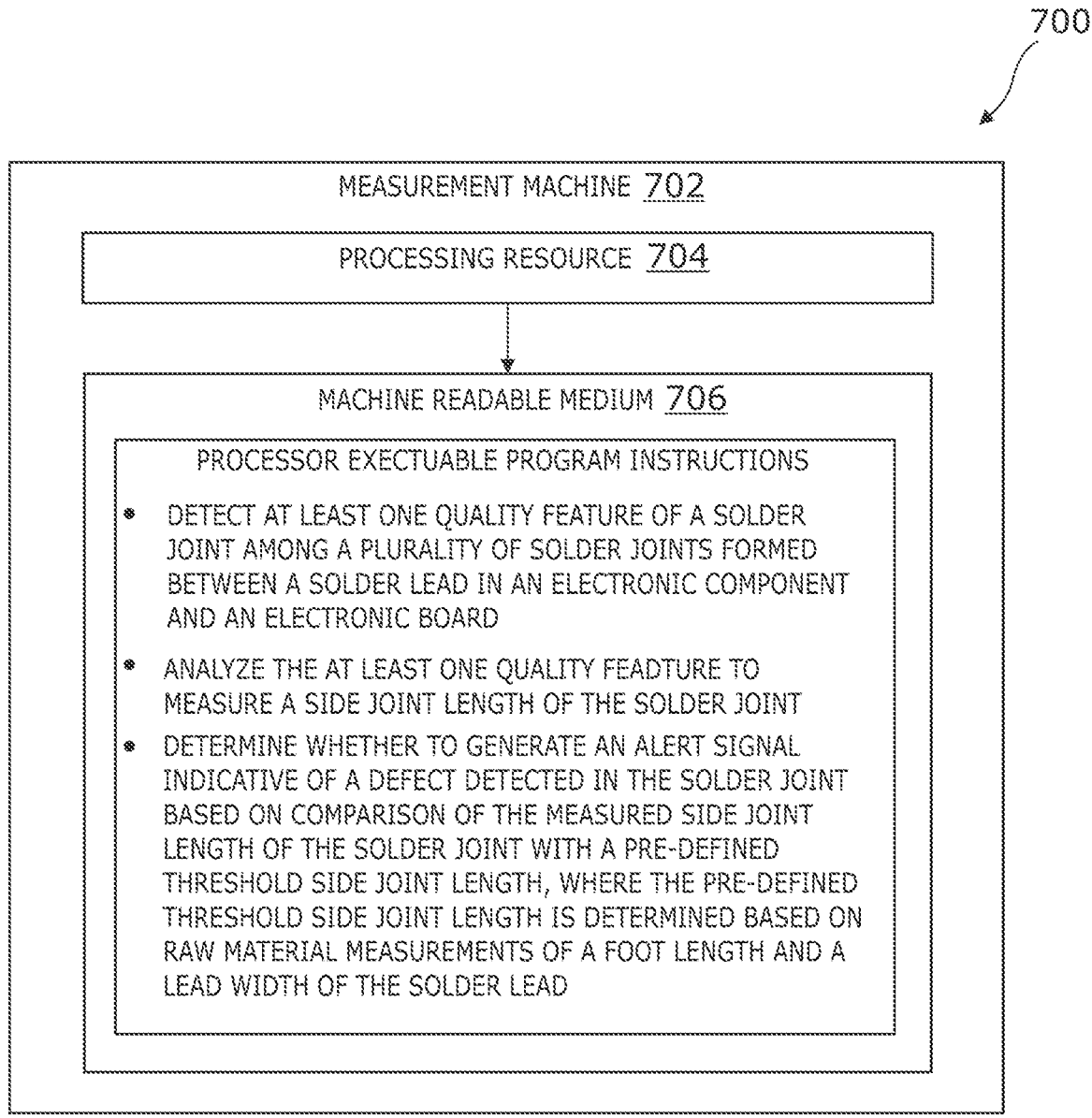
FIG. 7 is a block diagram depicting a measurement machine having a processing resource (or processor) operably coupled to a machine readable medium storing executable program instructions (algorithm) for detecting a defect in solder joints according to an example implementation of the present disclosure.

For purposes of explanation the present disclosure, certain examples are described with reference to the components illustrated in FIGS. 1-7. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-7 is an example and is not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

An electronic device includes electronic components and electronic boards, where the electronic components are typically connected to the electronic boards by soldering to form an interconnected electronic part of the electronic device. For example, the electronic device may be a computing device, and whereas the electronic components may include an integrated circuit chip, a chip package, a chip capacitor, a socket, or the like. Similarly, the electronic boards may include a printed circuit boards (PCBs), a substrate, a circuit board or the like, and whereas the interconnected electronic part may include a printed circuit assembly (PCA), a main logic board (MLB) assembly, or the like.

An interconnection technique, such as a plated through-hole technique, may be used to connect the electronic components to the electronic boards for forming the interconnected electronic part of the electronic device. For example, in the plated-through-hole technique, a plurality of solder leads of the electronic component may extend through a plurality of through-holes in the electronic board, and the plurality of solder leads may then be connected to the electronic board by soldering.

Because of shifts in the open standards of the interconnection technique, a surface mount technology may be used for connecting the electronic components to the electronic boards, instead of the plated through-hole technique. For example, in the surface mount technology, the electronic component may be mounted directly onto a surface of the electronic board, and the plurality of solder leads may be connected to the surface of the electronic board by soldering. The surface mount technology may include the following steps: i) flux application, ii) die placement, iii) solder reflow, and iv) under-fill processing for connecting the electronic component to the surface of the electronic board.

At times, a defect may occur in solder joints of the interconnected electronic part, due to warpage of the electronic board during heat-up and cool-down cycles in the solder reflow process of the surface mount technology. For example, the defect may be necking of the solder joints between at least some of the solder leads of the electronic component and the electronic board. Typically, necking of the solder joints may reduce (or decrease) the side joint lengths of the solder joints, and thus resulting in prematurely cracking of the solder joints. Accordingly, the electronic device having such interconnected electronic part may fail, causing an unplanned downtime of one or more workloads hosted by the electronic device, and cost associated with replacement and/or maintenance. Hence, there is a need for an inspection method that may detect solder joints that are defective (i.e., side joint lengths that do not meet acceptable criteria, such as pre-defined threshold side joint lengths) to segregate the defective interconnected electronic part in a quality test environment.

One inspection method utilized in the industry to detect defective solder joints is based on operator's judgement. For example, an image of the solder joints belonging to the interconnected electronic part (obtained from an imaging machine, for example) is visually analyzed by the operator to identify the solder joints that are defective. This is a non-destructive inspection method because it uses an image of the interconnected electronic part for visual inspection. However, this method is dependent on the operator's training and knowledge to identify the defective solder joints. Therefore, the non-destructive inspection method may be construed as a subjective inspection method, which lacks an objective metric to identify the defective solder joints. Hence, the non-destructive inspection method may allow the defective solder joints to bypass the quality test environment.

Another inspection method utilized in the industry, uses an optical microscopy for detecting defective solder joints. For example, at least one sample interconnected electronic part is broken-down such that a cross-section of the solder joints in the sample interconnected electronic part may be inspected using the optical microscopy to identify the solder joints that are defective. This method is a destructive inspection method because it requires the interconnected electronic part to be broken-down such that the solder joints are viewable to measure the length of the solder joints using the optical microscopy. Hence, this method may provide the objective metric to identify the defective solder joints, and prevent the solder joints that are defective to bypass the quality testing environment. However, the destructive inspection method used to detect the defective solder joints is not a viable inspection method, as this approach is unreliable due to sample selection, and costly because the plurality of interconnected electronic parts needs to be broken-down every time for inspection. Accordingly, there is a need for a non-destructive, viable inspection method that provides the ability to objectively detect defective solder joints.

A viable technical solution to the aforementioned problems includes training a measurement machine (e.g., an X-ray machine) to accurately measure side joint lengths of solder joints, and detecting defective solder joints based on measured side joint lengths. In other words, the measurement machine is first trained to accurately measure the side joint lengths of actual solder joints using training data. In one or more examples, the training data represents the side joint lengths measured by another measurement machine (e.g., optical microscopy). For example, the optical microscopy may analyze a cross-section of solder joints to precisely measure the side joint lengths of a set of solder joints to generate the training data. Thus, the training data may function as a benchmark or reference data for training the X-ray machine to accurately measure the side joint lengths of the solder joints. Later, the X-ray machine is used for detecting the solder joints that are defective based on comparison of the measured side joint length of each solder joint with a pre-defined threshold side joint length.

In one or more examples, the X-ray machine is trained based on an analysis of a correlation value obtained by a statistical analysis of a relationship between the first data obtained from the X-ray machine, and the second data obtained from the optical microscopy. In some examples, training the X-ray machine may include updating an algorithm used by the X-ray machine, to accurately measure the side joint lengths of the solder joints. In some examples, after the analysis of the correction value, if it is determined that the correction value is outside (i.e., equal or below) a pre-defined value, the algorithm used in the X-ray machine is updated based on the second data to reduce the deviation between the first and second data. In some other examples, after the analysis of the correction value, if it is determined that the correction value is inside (i.e., above) the pre-defined value, a new correction value is obtained based on the statistical analysis of the relationship between another set of first and second data. In such examples, after the analysis, of the new correlation value, if it is determined that the new correction value is outside the pre-defined value, the algorithm used in the X-ray machine may be further updated based on the second data in other set of the first and second data to reduce the deviation between the first and second data. However, after the analysis of the new correlation value, if it is determined that the new correction value is inside the pre-defined value, the algorithm may be updated with the pre-defined threshold side joint length. Thus, enabling the updated algorithm to detect the defect among the solder joints based on comparison of the measured side joint length of each solder joint with the pre-defined threshold side joint length.

In one or more examples, the X-ray machine having the updated algorithm may be deployed in a quality test environment, for detecting the solder joints that are defective. For example, the X-ray machine may non-destructively detect at least one quality feature of the solder joint, and analyze the at least one quality feature to measure the side joint length of the solder joint. In such examples, the X-ray machine may determine whether to generate an alert signal indicative of the defect detected in the solder joint based on comparison of the measured side joint length of the solder joint with a pre-defined threshold side joint length. In one or more examples, the pre-defined threshold side joint length is determined based on an analysis of raw material measurements of a foot length and a lead width of the solder lead.

Accordingly, the present disclosure describes example implementations of an inspection method for i) training a measurement machine to accurately measure side joint lengths of a plurality of solder joints, and ii) detecting a defect among the plurality of solder joints based on the measured side joint lengths by the measurement machine. In one or more examples, the method includes receiving a first data representing side joint lengths of the plurality of solder joints measured by a first measurement machine, where the plurality of solder joints is formed between an electronic component (for example, a socket or a memory socket, in particular) and an electronic board (for example, a circuit board) to form an interconnected electronic part of an electronic device. The method further includes receiving a second data representing the side joint lengths of the plurality of solder joints measured by a second measurement machine. Further, the method includes determining a correlation value based on a statistical analysis of a relationship between the first and second data. The method further includes training the first measurement machine by updating an algorithm used by the first measurement machine to measure the side joint lengths, based on the analysis of the correlation value to reduce deviation between the first and second data. In one or more examples, the algorithm may be implemented as a dimensional metrology in the first measurement machine to detect the defect among the plurality of solder joints.

FIG. 1A illustrates a perspective view of an electronic device 100 having one or more electronic modules, such as an electronic component 102 and an electronic board 104. In some examples, the electronic device 100 may be a computing device, a workstation, a server, or the like, the electronic component 102 may include an integrated circuit chip, a chip package, a chip capacitor, a socket, or the like, and the electronic board 104 may include a printed circuit boards (PCBs), a substrate, a circuit board, or the like. In the example illustrated in FIG. 1A, the electronic device 100 is the computing device 100A, the electronic component 102 is the socket 102A, and the electronic board 104 is the circuit board 104A. In some examples, the socket 102A may be a double data rate (DDRx) socket (or the memory socket) and the circuit board 104A may be a main logic board. In one or more examples, the socket 102A is mounted onto a surface of the circuit board 104A, and connected to the circuit board 104A by soldering 106 (as shown in FIG. 1B).

The electronic device 100 may additionally include one or more other electronic modules, such as a processor (not shown), that is connected with a memory system of the computing device 100A, and one or more power sources (not shown) that are connected with the memory system via the circuit board 104A. In such examples, the socket 102A may be part of the memory system that stores data for the computing device 100A. The power source may be electrically connected to traces of the circuit board 104A, which supply power to the socket 102A. In some examples, the memory system may include a circuit card (not shown) connected to the circuit board 104A via the socket 102A. The circuit card may constitute a Synchronous Dynamic Random Access Memory (SDRAM) module or a Dual In-line Memory Module (DIMM module). In the illustrated example, the socket 102A is configured to receive the circuit card to form the memory system, and orient the circuit card at a right angle with respect to the circuit board 104A. In some examples, the socket 102A and the circuit card are electrically connected to one or more data devices (not shown) for sending data thereto and/or receiving data therefrom. In such examples, the circuit card may store data generated by the data devices and/or sends stored data to the data devices.

The socket 102A includes a housing 108 having a base end 110 mounted onto the circuit board 104A, and a mating end 112 generally opposite the base end 110 for mating with the circuit card. The housing 108 includes a longitudinally extending slot 114 at the mating end 112 for receiving the circuit card, and a plurality of solder leads 116 at the base end 110 for connecting with the circuit board 104A by soldering 106. In some examples, the socket 102A further includes a pair of latches 118 disposed at opposite ends of the housing 108, where the pair of latches 118 is configured to bend outwardly to receive the circuit card, and bend inwardly to hold the circuit card within the socket 102A. The plurality of solder leads 116 may transmit power and signal from the circuit board 104A to the circuit card and vice versa. In some examples, the socket 102A has "288" numbers of solder leads 116 arranged along "2" rows that are disposed parallel to one another laterally 10 along a width of the housing 108. In other words, each row has "144" number of solder leads 116 disposed longitudinally 20 along a length of the housing 108. In such examples, the first solder leads "$P_1$", "$P_{145}$" of the plurality of solder leads 116, in each row are disposed mutually opposite to one another laterally, and the last solder leads "$P_{144}$", "$P_{288}$" in each row are also disposed opposite to one another laterally 10. As used herein the term "laterally" may refer to a direction that is perpendicular to a direction along which the circuit card is inserted into the slot 114 of the socket 102A. Similarly, the term "longitudinally" may refer to a direction that is parallel to the direction along which the circuit card is inserted into the slot 114 of the socket 102A.

FIG. 1B is a cross-sectional side view of the portion of the electronic device 100 taken along line 1-1' in FIG. 1A. For example, the cross-sectional side view is taken such that the first solder leads "$P_1$", "$P_{145}$" of the plurality of solder leads 116 are depicted in FIG. 1B. In one or more examples, a solder joint 106 is formed between each of the plurality of solder leads 116 and a corresponding pad 120 in the circuit board 104A to connect the socket 102A to the circuit board 104A. For example, the first solder leads "$P_1$", "$P_{145}$" are connected to pads 120A, 120B respectively, in the circuit board 104A via respective solder joints 106A, 106B. In one or more examples, a surface mount technology is employed to connect the socket 102A to the circuit board 104A. As discussed hereinabove, the surface mount technology may typically include the following steps for connecting (i.e., soldering) the socket 102A to the circuit board 104A, for example, i) flux application, ii) die placement, iii) solder reflow, and iv) under-fill processing. Since, the surface mounting technology is an industry standard method for connecting the electronic modules, it is not discussed herein in greater details. In some examples, each mutually opposite solder leads of the plurality of solder leads 116, (e.g., the first solder leads "$P_1$", "$P_{145}$", etc.) form a gull wing shaped solder lead of the socket 102A. Further, each solder lead of the plurality of solder leads 116 has a foot 122 and a body 124 connected to the foot 122. In such examples, the foot 122 has a flat structure or is a flat gull wing solder lead. In one or more examples, each solder joint 106 is formed between the foot 122 of its respective solder lead 116 and the pad 120 on the circuit board that corresponds to the respective solder lead.

FIG. 2A is a block diagram depicting a cross-sectional front view of a portion of an electronic device 100 according to an example implementation of the present disclosure. The cross-sectional front view of the electronic device 100 shown in FIG. 2A may resemble a cross-sectional front view of the electronic device 100, when taken along line 2-2' in FIG. 1A. As discussed herein, the electronic device 100 may be a computing device 100A, the electronic component 102 may be a socket 102A, and the electronic board 104 may be a circuit board 104A. In such examples, the socket 102A may be connected to the circuit board 104A via the solder joints 106A.

In the example depicted in FIG. 2A, some of the solder joints 106A are defective due to warpage of the circuit board 104A during heat-up and cool-down cycles in the solder reflow process of the surface mount technology. The defect may be necking of the solder joints 106A between at least some of the solder leads 116 of the socket 102A and the circuit board 104A. For example, a solder joint $106A_1$ formed between the first solder lead "$P_1$" of the plurality of solder leads 116, and the first pad $120A_1$ of the circuit board 104A, and a solder joint $106A_{144}$ formed between the last solder lead "$P_{144}$" and the last pad $120A_{144}$ of the circuit board 104A may be elongated (necked). Typically, the necking (or elongation) of the solder joints $106A_1$, (or $106A_{144}$) may reduce or decrease the solder joints side length or side joint length "dim-$D_1$" (as shown in FIG. 2B) or "dim-$D_{144}$", thus resulting in prematurely cracking of the solder joints 106A, 106B. However, a substantially center solder joints $106A_{78}$ (or $106A_{79}$) formed between a substantially center solder lead "$P_{78}$" (or "$P_{79}$") and a substantially center pad $120A_{78}$ (or $120A_{79}$) of the circuit board 104A may not have the defect (i.e., not elongated (or necked)). Thus, the solder joints $106A_{78}$ or $106A_{79}$ may have appropriate side joint lengths "dim-$D_{78}$" or "dim-$D_{79}$" (as shown in FIG. 2C).

FIG. 2B is a block diagram depicting a cross-sectional side view of one solder joint 106A, for example, the first solder joint $106A_1$ in the electronic device 100 of FIG. 2A according to an example implementation of the present disclosure. In the example of FIG. 2B, the solder joint $106A_1$ is elongated (necked) resulting in having a side joint length "dim-$D_1$" formed at a radial joint length "$L_1$" there between the pad $120A_1$ and the first lead "$P_1$". As shown in FIG. 2B, the side joint length "dim-$D_1$" has reduced or decreased thickness at a center of the solder joint $106A_1$, thereby causing the solder joint $106A_1$ to crack prematurely. Thus, the solder joint $106A_1$ having the reduced side joint length "dim-$D_1$" may be classified as a defective solder joint.

FIG. 2C is a block diagram depicting a cross-sectional side view of another solder joint 106, for example, the center solder joint $106A_{78}$ in the electronic device 100 of FIG. 2A according to an example implementation of the present disclosure. In the example of FIG. 2C, the solder joint $106A_{78}$ has a side joint length "dim-$D_{78}$" formed at a radial joint length "$L_{78}$" there between the pad $120A_{78}$ and the center lead "$P_{78}$". The side joint length "dim-$D_{78}$" has a substantially greater thickness than the side joint length "dim-$D_1$", and the radial joint length "$L_{78}$" is substantially smaller than the radial joint length "$L_{78}$", thereby causing the solder joint $106A_{78}$ to have a substantially better bonding/coupling with the circuit board 104A. Thus, the solder joint $106A_{78}$ having the side joint length "dim-$D_{78}$" may be classified as a non-defective solder joint.

As discussed above, an operator's judgment may be used as a non-destructive inspection method to detect the aforementioned conditions (i.e., defective and/or non-defective solder joints). This non-destructive inspection method is dependent on the operator's training and knowledge to identify the defective solder joints, such as the solder joint $106A_1$, $106A_{144}$ and and/or non-defective solder joints, such as $106A_{78}$. As a result, the operator's judgment is subjective and lacks an objective metric that may allow the defective solder joints $106A_1$, $106A_{144}$ to bypass the quality test environment. Additionally, as discussed above, another inspection method may use an optical microscopy for detecting defective solder joints. However, the optical microscopy uses a destructive inspection method for detecting defects. For example, referring to FIG. 2A, the electronic device 100 may be broken-down such that a cross-section of the solder joint $106A_1$, for example, as shown in FIG. 2B may be measured using the optical microscopy to accurately determine side joint lengths "dim-$D_1$" (and/or "dim-$D_{78}$" and/or "dim-$D_{144}$"). Later, the measured side joint lengths "dim- $D_1$" (and/or "dim-$D_{78}$" and/or "dim-$D_{78}$") may be analyzed to identify the solder joint $106A_1$ that is defective. Hence, this destructive inspection method may provide the objective metric to identify the defective solder joint, in order to prevent the solder joints 106 that are defective to bypass the quality testing environment. However, the destructive inspection method used to measure the side joint lengths "dim-D" and detect the defective solder joints 106 based on the measured side joint lengths "dim-D" is not a viable inspection method because it requires breaking the electronic device 100 for measuring side joint lengths "dim-D".

Accordingly, in some examples of the present disclosure, a measurement machine, for example, an X-ray machine, which is based on non-destructive inspection method, is trained to accurately measure the side joint length "dim-$D_1$" of the solder joints 106. In some examples, the X-ray machine is trained based on the measurement data by the optical microscopy to accurately measure side joint length "dim-$D_1$" (by the optical microscopy) of the solder joints 106. In such examples, the measurement data of the side joint lengths "dim-$D_2$" obtained from the optical microscopy may function as a benchmark or reference data for training the X-ray machine to accurately measure the side joint lengths "dim-$D_1$" of the solder joints. In one or more examples, after the X-ray machine is trained, it may be used to detect the solder joints 106 that are defective based on comparison of the measured side joint length "dim-$D_1$" (by the X-ray machine) with a pre-defined threshold side joint length "dim-$D_3$" (shown in FIG. 3A). The method of training the X-ray machine to measure the side joint lengths "dim-$D_1$" and detect the solder joints that are defective are discussed in greater detail below.

FIG. 3A is a perspective side view of a solder joint 106 formed between a solder lead 116 and a pad 120 according to example implementation of the present disclosure. FIG. 3B is a perspective front view of a solder joint 106 formed between a solder lead 116 and the pad 120 according to example implementation of the present disclosure. In some examples, the solder lead 116 may be a center solder lead "$P_{78}$", for example, and the solder joint "106" may be a center solder joint "$106_{78}$", for example. As discussed hereinabove, the solder lead 116 has a foot 122 and a body 124 connecting the foot 122. The foot 122 has a flat structure or a flat gull wing solder lead. In some examples, the foot 122 has a length "L" and a width "W", which may be derived through direct measurements and/or cross-sectioning of a randomly selected sub-group of sockets 102A from the same batch that were used in a correlation study (as discussed below in detail).

In one or more examples, the solder joint 106 is formed between the foot 122 and the pad 120. In such examples, the solder joint 106 has a side joint length "dim-D" extending along the length "L" of the foot 122. In such examples, the measurement machine is trained to accurately measure the side joint length "dim-D" of the solder joint 106.

In one or more examples, a pre-defined threshold side joint length "dim-$D_3$" is determined based on raw material measurements of the foot length "L" and the lead width "W" of each of the plurality of solder leads 116. In such examples, the pre-defined threshold side joint length "dim-$D_3$" may function as a comparison criteria to decide whether a specific solder joint is acceptable (i.e., non-defective) or non-acceptable (i.e., defective). In other words, a side joint length of a specific solder joint may be compared to the criteria set by the threshold side joint length to determine whether a specific solder joint is defective or non-defective. In some examples, the determined pre-defined threshold side joint length "dim-$D_3$" meets (i.e., acceptable) an institute for printed circuits-A-610 (IPC-A-610) standard requirements for printed circuit joints. It may be noted herein that "IPC-A-610" is an individual level certification based on a standard published by IPC titled "Acceptability of Electronic Assemblies". In one or more examples, the pre-defined threshold side joint length "dim-$D_3$" indicates that a side joint length of a specific solder joint should be greater than or equal to a three times the lead width "3 W" of the solder lead corresponding to that specific solder joint in order to obtain a solder joint that is non-defective. For example, the solder joint having the side joint length of 3.5 W, 4 W, or 4.25 W may be considered as a non-defective solder joint. However, the solder joint having the side joint length of 2.8 W, 2.5 W, or 2 W may be considered as the defective solder joint. In some other examples, the pre-defined threshold side joint length "dim-$D_3$" indicates that a side joint length of a specific solder joint should be greater than or equal to seventy five percentage of the foot length "L" of the solder lead 116 corresponding to that specific solder joint in order to obtain a solder joint that is non-defective. For example, the solder joint having the side joint length as 78%, 80%, or 85% of the foot length "L" may be considered as the non-defective solder joint. However, the solder joint having the side joint length as 73%, 67%, or 60% of the foot length "L" may be considered as the defective solder joint.

In some examples, the foot length "L" and the lead width "W" of each of the plurality of solder leads 116 are measured for determining the pre-defined threshold side joint length "dim-$D_3$". For example, the foot length "L" and the lead width "W" of the plurality of solder leads obtained from multiple batches (and vendors) are measured to determine an average foot length "AL" and an average lead width "AW" of the solder lead 116. Later, the pre-defined threshold side joint length "dim-$D_3$" is determined based on the average foot length "AL" and the average lead width "AW" of the solder lead 116. In such examples, the pre-defined threshold side joint length "dim-$D_3$" may function as the comparison criteria to decide whether a specific solder joint is acceptable (i.e., non-defective) or non-acceptable (i.e., defective).

Figure 4:
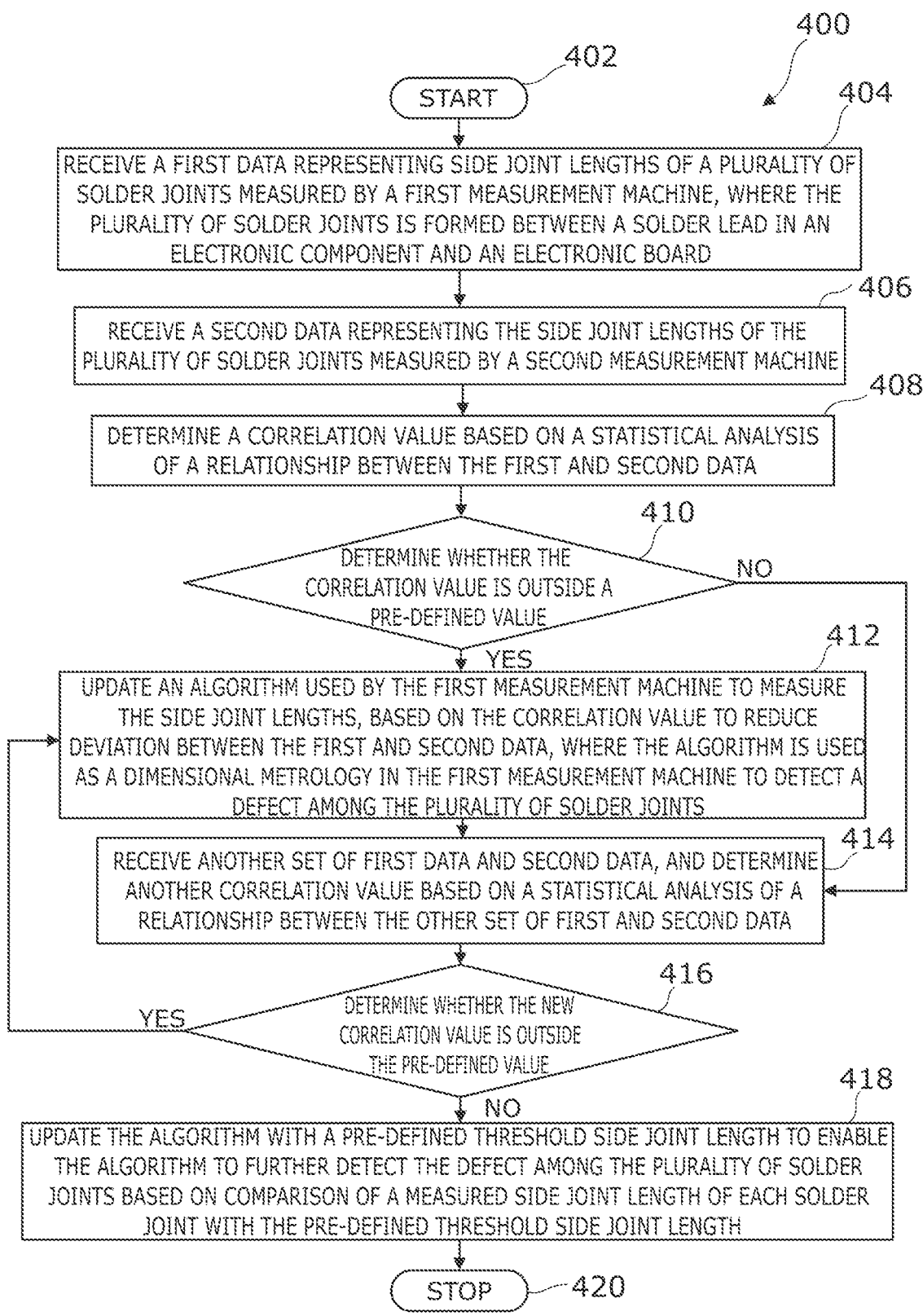
FIG. 4 is a flow diagram depicting a method of training a measurement machine for measuring side joint lengths of the solder joints according to an example implementation of the present disclosure.

FIG. 4 is a flow diagram depicting a method 400 of training a measurement machine (or a first measurement machine) to measure side joint lengths of solder joints according to an example implementation of the present disclosure. It should be noted herein that the method 400 is described in conjunction with FIGS. 1A-1B, 2A-2C, and 3A-3B. In some examples, the first measurement machine is an X-ray machine, for example, a 3-dimensional or 5-dimensional X-ray machine.

In one or more examples, a plurality of steps discussed herein is performed by a computing system. In some examples, the computing system may include a processing resource, a machine readable medium storing executable program instructions, and a memory. The processing resource may be a physical processor. In some examples, the physical processor may be a microprocessor suitable for performing the functionality described in relation to FIG. 4. In some examples, the machine readable medium is non-transitory and is alternatively referred to as a non-transitory machine readable medium. The processing resource may execute one or more program instructions (e.g., processing resource executable program instructions) to perform one or more functions described in FIG. 4. The memory may store an algorithm that may be used by the first measurement machine (i.e., the X-ray machine) to measure the side joint lengths "dim-D". In such examples, after the X-ray machine is trained to measure the side joint lengths, an updated algorithm (i.e., based on training) may be implemented in the first measurement machine to detect defects among a plurality of solder joints, as discussed in greater details in FIGS. 6-7.

The method 400 starts at block 402 and continues to block 404. At block 404, the method 400 includes receiving a first data representing side joint lengths "dim-$D_1$" of a plurality of solder joints measured by the first measurement machine. As discussed herein, the plurality of solder joints may be formed between a solder lead in an electronic component and an electronic board using a surface mounting technology to form an interconnected electronic part of the electronic device.

In some examples, the computing system may receive the first data after the first measurement machine performs the following sub-steps: a) measuring the side joint lengths of the solder joint, b) generating the first data representing the side joint lengths, and c) communicating the measured side joint lengths to the computing system. Accordingly, the first measurement machine (or the X-ray machine) may also include a processor to execute one or more executable program instructions as per an algorithm stored in a machine readable medium of the first measurement machine to perform the aforementioned sub-steps.

In some examples, a sample interconnected electronic part of the electronic device having a plurality of solder joints to connect the socket to the circuit board, may be selected from a batch of the interconnected electronic parts. In such examples, the sample interconnected electronic part may be subjected to inspection using the first measurement machine to measure the side joint lengths "dim-$D_1$". During the inspection, the first measurement machine may include a processor, which may execute an algorithm to first detect at least one quality feature of the solder joint, and analyze the at least one quality feature in order to measure the side joint length "dim-$D_1$" of the solder joint. The at least one quality feature may include gray value gradients and/or mean gray values that may be determined by the first measurement machine in an inspection area, such as the solder joint in the sample interconnected electronic part. The processor of the first measurement machine may further execute the algorithm to later analyze the gray value gradients and/or the mean gray values to measure the side joint lengths "dim-$D_1$" of the plurality of solder joints. In some examples, the first measurement machine may use an image analytics software to determine the side joint lengths "dim-$D_1$" from the gray value gradients and/or the mean gray values. The first measurement machine may then generate the first data representing the side joint lengths "dim-$D_1$" of the solder joints. Later, the first measurement machine may communicate the first data to the computing system. In some examples, the transfer of data may happen in an online mode i.e., via a network, or an offline mode i.e., a flash drive, or the like.

The method 400 continues to a step 406. At step 406, the method 400 includes receiving a second data representing the side joint lengths "dim-$D_2$" of the plurality of solder joints measured by a second measurement machine. In some examples, the second measurement machine may be an optical machine, such as an optical microscopy. As discussed herein, the optical microscopy may perform a cross-section analysis of the plurality of solder joints in the same sample interconnected part was used by the first measurement machine to generate the first data, in order to generate the second data. In other words, the second data is generated based on a destructive method, where the sample interconnected electronic part was inspected by the first measurement machine is broken-down such that the cross-section of the solder joints may be subjected to inspection using the optical microscopy to measure the side joint lengths "dim-$D_2$". The second measurement machine may then generate the second data representing the side joint lengths "dim-$D_2$" of the solder joint. Later, the second measurement machine may communicate the second data to the computing system. In some examples, the transfer of data may happen in the online mode i.e., via the network, or in the offline mode i.e., the flash drive. In one or more examples, the second data may function as a benchmark or reference data for training the first measurement machine to accurately measure the side joint lengths "dim-$D_1$" of the solder joints. The method 400 continues to block 408.

At block 408, the method 400 includes determining a correlation value based on a statistical analysis of a relationship between the first and second data. In one or more examples, the correction is a statistic analysis that measures a degree to which two data (i.e., the first and second data) move in relation to each other. Referring to FIG. 5A (in parallel along with FIG. 4), it depicts a graph 500 representing a correlation based on statistical analysis of a relationship between the first and second data. The first data representing the side joint lengths "dim-$D_1$" is plotted with reference to a y-axis 502 on the graph 500, and the second data representing the side joint lengths "dim-$D_2$" is plotted with reference to an x-axis 504 on the graph 500 to measure the statistical relationship between the first and second data. In one or more examples, the correction value may be a correlation coefficient value and/or a coefficient of determination value.

In some examples, the correlation coefficient (CC) value is used to measure how strong a relationship is between the first and second data. In other words, the CC value may be used to measure a strength of the linear relationship between the first and second data. In some examples, a Pearson correlation, such as a Minitab may be used to determine the CC value based on the first and second data. In such examples, the CC value may range between "−1" to "1", where the negative value "−1" indicates a strong negative relationship, and the positive value "1" indicates a strong positive relationship. In particular, if the CC value is ranged between "−0.65" to "0.65", than it suggests a meaningful correlation between the first and second data. More particularly, the CC value ranging above "0.65" (and may be proximate to "1") is categorized as a pre-defined correlation coefficient range (or pre-defined value), which suggests a meaningful or strong relationship between the first and second data, or reduced deviation between the first and second data, or a reduced deviation in the first data with reference to the second data. Referring again to FIG. 5A, the side joint lengths "dim-$D_1$" and "dim-$D_2$" are scattered in the graph 500, thus the CC value based on the first and second data is determined to be around "0.0209". In other words, the CC value of "0.0209" indicates that the first and second data do not fall close to one another.

The coefficient of determination ($R^2$) value may be used to analyze how differences in the first data may be explained by a difference in the second data. More specifically, the $R^2$ value provides an idea of how many data points fall within the results of a linear line 506 formed by a regression equation. In some examples, the $R^2$ value may range between "0" to "1" (i.e. "0%" to "100%"). In particular, the $R^2$ value ranging above "0.8" ("80%", and may be proximate to "100%"), is categorized as a pre-defined coefficient of determination percentage (or pre-defined range), which suggests a greater percentage of the first data falling within/ closer to the linear line 506, or reduced deviation between the first and second data, or a reduced deviation in the first data with reference to the second data. Referring again to FIG. 5A, the side joint lengths "dim-$D_1$" and "dim-$D_2$" are located away from the linear line 506, thus the $R^2$ value based on the first and second data is determined to be around "0.044" ("4.4%"). In other words, the $R^2$ value around four percentage indicates a substantially lesser percentage of the first data falls close to the linear line 506.

The method continues to block 410. At block 410, the method 400 includes determining whether the correlation value (i.e., the correlation coefficient (CC) value and/or the coefficient of determination ($R^2$) value is outside (i.e., equal or below) a pre-defined value (i.e., the pre-defined correlation coefficient range and/or the pre-defined coefficient of determination percentage). Referring to FIG. 5A, the CC value is "0.0209", which is outside the pre-defined value of "0.65". Similarly, the $R^2$ value is "4.4%", which is outside the pre-defined value of "80%".

Therefore, at block 410, in response to the processing resource of the computing system determining that the CC value and/or the $R^2$ value are outside (i.e., equal or below) the pre-defined value, i.e., "yes" at block 410, the method 400 continues to block 412. In some examples, the algorithm may be updated in response to determining that the CC value and the $R^2$ value are outside the pre-defined value. In some other examples, the algorithm may be updated in response to determining that the CC value or the $R^2$ value is outside the pre-defined value. At block 412, the method 400 includes the processing resource to proceed with updating the algorithm stored in the memory (which may be used by the first measurement machine), to measure the side joint lengths "dim-$D_1$" in order to reduce deviation between the first and second data. In such examples, the algorithm may be used as a dimensional metrology in the first measurement machine to detect a defect among the plurality of solder joints. In some examples, updating the algorithm in response to determining that the correlation value is outside the pre-defined correlation coefficient range and/or the pre-defined coefficient of determination percentage, based on the second data may include tweaking the algorithm used by the measurement machine. In one or more examples, tweaking the algorithm may include updating the algorithm to vary one or more measurement points in the gray value gradients and/or mean gray values to accurately measure the side joint lengths "dim-$D_1$" of the solder joint. In some examples, tweaking the algorithm may help the measurement machine to precisely detect the at least one quality feature, such as the gray value gradients and/or mean gray values so as to accurately measure the side joint lengths "dim-$D_1$" of the solder joint in the sample interconnected electronic part. The method 400 continues to block 414.

Further, referring back to block 410, in response to the processing resource of the computing system determining that the CC value and/or the $R^2$ value are inside (i.e., above) the pre-defined value, i.e., "no" at block 410, the method 400 continues to block 414. In other words, in response to determining that the CC value and/or the $R^2$ value are inside the pre-defined value, then the algorithm may not be updated. In some examples, the algorithm may not be updated in response to determining that the CC value and the $R^2$ value are inside the pre-defined value. In some other example, the algorithm may not be updated in response to determining that the CC value or the $R^2$ value is inside the pre-defined value. However, in order to perform a gauge R&R (repeatability and reproducibility) on another set of first data and second data, the method 400 continues to block 414.

At block 414, the method 400 includes receiving another set of first data and second data from the first and second measurement machines respectively, and determining another correlation value (a new correlation value) based on a statistical analysis of a relationship between the other set of first and second data. Referring to FIG. 5B (in parallel along with FIG. 4), it depicts a graph 550 representing the other correlation based on the statistical analysis of the relationship between the other set of the first and second data. As discussed hereinabove, the other set of the first and second data may be received from the first and second measurement machines respectively. In particular, the other set of the first and second data are generated from another sample interconnected electronic part of the electronic device having a plurality of solder joints, selected from another batch. In such examples, the first measurement machine may inspect the other sample interconnected electronic part to generate the first data, as discussed hereinabove. Further, the second measurement machine may perform a cross-section analysis of the plurality of solder joints in the same other sample interconnected electronic part that is been used by the first measurement machine to generate the first data, to generate the second data as discussed hereinabove.

In such examples, the first data representing the side joint lengths (new dim-$D_1$) is plotted with reference to a y-axis 552 on the graph 550, and the second data referring to the side joint lengths (new dim-$D_2$) is plotted with reference to an x-axis 554 on the graph 550 to measure the statistical relationship between the other set of the first and second data. Later, the statistical model may be used to determine the other correlation value (or the new correlation value). The other correction value may be a new correlation coefficient (new CC) value and/or a new coefficient of determination (new $R^2$) value.

Referring again to FIG. 5B, the side joint lengths (new dim-$D_1$ and new dim-$D_2$) are clustered in the graph 550, thus the new CC value based on the other set of the first and second data is determined to be around "0.933". In other words, the CC value of "0.933" indicates that the first and second data fall close to one another. Further, referring to FIG. 5B, the side joint lengths (new dim-$D_1$ and new dim-$D_2$) are located closer to the linear line 556, thus the $R^2$ value based on the other set of the first and second data is determined to be around "0.872" ("87.2%"). In other words, the $R^2$ value of around eighty seven percentage indicates a substantially greater percentage of the first data from the other set is falling closer to the linear line 556.

Referring back to FIG. 4, the method 400 continues to block 416. At block 416, the method 400 includes determining whether the new correlation value (i.e., the new correlation coefficient (CC) value and/or the new coefficient of determination ($R^2$) value is outside a pre-defined value (i.e., the pre-defined correlation coefficient range and/or the pre-defined coefficient of determination percentage). Referring back to FIG. 5B, the CC value is "0.93", which is inside (i.e., above) the pre-defined value of "0.65". Similarly, the $R^2$ value is "87.2%", which is inside (i.e., above) the pre-defined value of "80%". Therefore, at block 416, in response to the processing resource of the computing system determining that the CC value and/or the $R^2$ value is inside the pre-defined value, i.e., "no" at block 416, the method 400 continues to block 418.

At block 418, the method 400 includes the processing resource to proceed with updating the algorithm with a pre-defined threshold side joint length "dim-$D_3$". In some examples, the updated algorithm may be used in the measurement machine (X-ray machine) to detect the defect among the plurality of solder joints based on comparison of a measured side joint length "dim-$D_1$" of each solder joint with the pre-defined threshold side joint length "dim-$D_3$". In some examples, the pre-defined threshold side joint length "dim-$D_3$" is determined based on raw material measurements of the foot length and the lead width of each of the plurality of solder leads, as discussed in FIGS. 3A and 3B. The measured side joint length "dim-$D_1$" may need to greater than or equal to a three times the lead width in order to obtain the solder joint that are non-defective. In some other examples, the measured side joint length "dim-$D_1$" may need to be greater than or equal to seventy five percentage of the foot length of the solder lead in the socket in order to obtain the solder joint that are non-defective.

Referring back to block 416, however, in response to determination by the processing resource of the computing system that the CC value and/or the $R^2$ value is outside (i.e., equal or below) the pre-defined value, i.e., "yes" at block 416, the method 400 loops back to block 412. In such examples, the method 400 includes repeating the steps in the blocks 412, 414, and 416 using yet another set of first and second data, until the processing resource of the computing system determines that the CC value and/or the $R^2$ value is inside (i.e., above) the pre-defined value, i.e., "no" at block 416. Thus, the first measurement machine is trained to accurately measure the side joint lengths "dim-$D_1$" of the solder joints based on the side joint lengths "dim-$D_2$" of the solder joints measured by the optical microscopy. Accordingly, the updated algorithm (trained) is used as a dimensional metrology in the first measurement machine to detect the defect among the plurality of solder joints.

In some other examples, the first measurement machine, for example, the X-ray machine may include a processor to perform the one or more steps discussed in steps 406 to 418. For example, the processor of the X-ray machine may first execute the algorithm (default algorithm) to measure the side joint lengths of the plurality of solder joints for generating the first data. Further, the processor may receive the second data representing the side joint lengths of the plurality of solder joints measured by the second measurement machine. Further, the processor may determine the correlation value based on the statistical analysis of the relationship between the first data and the second data. Later, the processor may determine whether the correlation value is outside or inside the pre-defined value. In response to determining that the correlation value is outside the pre-defined value, then the processor may update the default algorithm to improve the accuracy in measuring the side joint lengths of the plurality of solder joints. However, in response to determining that the correlation value is inside the pre-defined value, then the processor may not update the default algorithm used for measuring the side joint lengths of the plurality of solder joints. Accordingly, the X-ray machine may be trained (or update the default algorithm) to accurately measure the side joint lengths of the plurality of solder joints. In one or more examples, the trained X-ray machine be used to determine the solder joints that are defective based on comparison of the measured side joint lengths with a pre-defined threshold side joint length. The steps involved in determining the defective solder joints are discussed in greater details in the example of FIG. 6. The method 400 ends at block 420.

FIG. 6 is a flow diagram depicting a method 600 for detecting a defect in solder joints according to an example implementation of the present disclosure. In one or more examples, a plurality of steps discussed herein may be performed by a measurement machine (or a first measurement machine). In some examples, the first measurement machine is an X-ray machine. In one or more examples, the measurement machine may include a processing resource and a machine readable medium storing executable program instructions (or an updated algorithm or trained algorithm) received from a computing system, as discussed hereinabove with reference to FIGS. 4 and 5A-5B. In some examples, the processing resource may be a physical processor. In some other examples, the physical processor may be a microprocessor suitable for performing the functionality described herein. In some examples, the machine readable medium is non-transitory and is alternatively referred to as a non-transitory machine readable medium.

The method 600 starts at block 602 and continues to block 604. At block 604, the method 600 includes detecting at least one quality feature of a solder joint among a plurality of solder joints formed between a solder lead in an electronic component, such as socket, and an electronic board, such as a circuit board. The at least one quality feature may include gray value gradients and/or mean gray values that may be determined by the measurement machine in an inspection area, such as the solder joints in an interconnected electronic part of an electronic device. In some example, the measurement machine may obtain an image of the solder joints in the interconnected electronic part. The method 600 continues to block 606.

At block 606, the method 600 includes analyzing the at least one quality feature to measure a side joint length "dim-$D_1$" of each solder joint. In particular, the measurement machine may analyze the gray value gradients and/or the mean gray values to measure the side joint lengths "dim-$D_1$" of the plurality of solder joints. In some examples, the measurement machine may use an image analytics software to determine the side joint lengths "dim-$D_1$" from the gray value gradients and/or the mean gray values. The method 600 continues to block 608.

At block 608, the method 600 includes determining whether to generate an alert signal indicative of a defect detected in the solder joint based on comparison of the measured side joint length "dim-$D_1$" of each solder joint with a pre-defined threshold side joint length "dim-$D_3$". As discussed herein, the pre-defined threshold side joint length "dim-$D_3$" is determined based on raw material measurements of a foot length and a lead width of the solder lead. In some examples, the pre-defined threshold side joint length "dim-$D_3$" is greater than or equal to a three times a lead width. In some other examples, the pre-defined threshold side joint length "dim-$D_3$" is greater than or equal to seventy five percentage of the foot length of the solder lead.

In some examples, in response to determining that the measured side joint lengths "dim-$D_1$" is smaller than three times the lead width or less than seventy five percentage of the foot length of the solder lead, the measurement machine may generate an alert signal indicative of the defect in the solder joint. In other words, the solder joints are determined to be defective or non-defective based on comparison of the measured side joint length "dim-$D_1$" of the solder joint with a pre-defined threshold side joint length "dim-$D_3$". Additionally, the measurement machine may define a severity of the defect depending on a deviation range of the measured side joint length "dim-$D_1$" from the pre-defined threshold side joint length "dim-$D_3$". For example, the measurement machine may define the severity as "critical" in response to determining that the measured side joint length "dim-$D_1$" for each solder joint is greater than fifteen percent below the pre-defined threshold side joint length "dim-$D_3$". In some examples, the measured side joint length "dim-$D_1$" for the solder joint may be 2.5 millimeters, the pre-defined threshold side joint length "dim-$D_3$" may be 3 millimeters, and the value that is fifteen percent below the pre-defined threshold side joint length "dim-$D_3$" is 2.55 millimeters. In such examples, the measurement machine may flag the solder joint as a defective solder joint because the measured side joint length "dim-$D_1$" (2.5 millimeters) is below the threshold side joint length "dim-$D_3$" (3 millimeters). Further, the measurement machine may define the severity of the solder joint as critical because the measured side joint length "dim-$D_1$" (2.5 millimeters) is smaller than the value that is fifteen percent below the pre-defined threshold side joint length "dim-$D_3$" (2.55 millimeters). In some examples, the severity defined as "critical" may initiate a stopover of a production environment of the interconnected electronic part having the plurality of solder joints. In some other examples, the measurement machine may define the severity as "major" in response to determining that the measured side joint length "dim-$D_1$" for each of the plurality of solder joints is less than or equal to fifteen percent below the pre-defined threshold side joint length "dim-$D_3$". In some examples, the measured side joint length "dim-$D_1$" for the solder joint may be 2.85 millimeters, the pre-defined threshold side joint length "dim-$D_3$" may be 3 millimeters, and the value that is fifteen percent below the pre-defined threshold side joint length "dim-$D_3$" is 2.55 millimeters. In such examples, the measurement machine may flag the solder joint as a defective solder joint because the measured side joint length "dim-$D_1$" (2.5 millimeters) is below the threshold side joint length "dim-$D_3$" (3 millimeters). Further, the measurement machine may define the severity of the solder joint as major because the measured side joint length "dim-$D_1$" (2.85 millimeters) is greater than the value that is fifteen percent below the pre-defined threshold side joint length "dim-$D_3$" (2.55 millimeters). In some examples, the severity defined as "major" may include an indicator to initiate a process improvement in the manufacture of the interconnected electronic part having the plurality of solder joints.

In response to the measurement machine determining that the measured side joint lengths "dim-$D_1$" is greater than or equal to three times the lead width "dim-$D_3$" (e.g., 3.5 W, 3.8 W, 4 W, etc.) or greater than or equal to seventy five percentage of the foot length of the solder lead "dim-$D_3$" (e.g., 75%, 76%, 86.5%, 95%, etc.), than the measurement machine may not generate the alert signal. In such examples, the production environment may continue to manufacture the interconnected electronic part having the plurality of solder joints that are non-defective. The method 600 ends at block 610.

FIG. 7 depicts a block diagram 700 of a measurement machine 702 (or a first measurement machine or an X-ray machine) having a processing resource 704 and a machine readable medium 706 storing executable program instructions (updated algorithm or trained algorithm) to detect a defect among a plurality of solder joints. In some examples, the processing resource 704 is operably coupled to the machine readable medium 706. The processing resource 704 may be a physical processor. In some examples, the physical processor may be a microprocessor suitable for performing the functionality described in relation to FIG. 7. The machine readable medium 706 is non-transitory and is alternatively referred to as a non-transitory machine readable medium. In some examples, the machine readable medium 706 may be accessed by the processing resource 704. In some examples, the machine readable medium 706 stores the program instructions corresponding to functionality of the measurement machine 702. In such examples, the processing resource 704 executes one or more program instructions (e.g., processing resource executable program instructions) to perform one or more functions described in FIG. 6.

The processing resource 704 may execute program instructions for detecting at least one quality feature of a solder joint among the plurality of solder joints formed between a solder lead in a socket and a circuit board, as discussed in FIG. 6. In one or more examples, each solder joint of the plurality of solder joints has a flat gull wing solder lead. In such examples, the solder joint is formed between the flat gull wing solder lead and the circuit board. The measurement machine may obtain an image of the solder joints so as to capture gray value gradients and/or mean gray values in the solder joints.

Further, the processing resource 704 may execute the one or more program instructions for analyzing the at least one quality feature to measure a side joint lengths of the solder joints "dim-$D_1$", as discussed in FIG. 6. In some examples, the measurement machine may include an image analytics software to determine the side joint lengths "dim-$D_1$" from the gray value gradients and/or the mean gray values.

The processing resource 704 may further execute the one or more program instructions for determining whether the measured side joint lengths "dim-$D_1$" is above a pre-defined threshold side joint length "dim-$D_3$". In some examples, the pre-defined threshold side joint length "dim-$D_3$" is determined based on raw material measurements of a foot length and a lead width of each of the plurality of solder leads, as discussed in FIGS. 3A and 3B. In some examples, the measured side joint length "dim-$D_1$" may need to greater than or equal to a three times the lead width in order to obtain the solder joint that are non-defective. In some other examples, the measured side joint length "dim-$D_1$" may need to be greater than or equal to seventy five percentage of the foot length of the solder lead in order to obtain the solder joint that are non-defective.

In response to the processing resource 704 determining that the measured side joint lengths "dim-$D_1$" is smaller than three times the lead width or less than seventy five percentage of the foot length of the solder lead, than the processing resource 704 may generate an alert signal indicative of the defect in the solder joint based on comparison of the measured side joint length "dim-$D_1$" of the solder joint with a pre-defined threshold side joint length "dim-$D_3$". In response to the processing resource 704 determining that the measured side joint lengths "dim-$D_1$" is greater than or equal to three times the lead width "dim-$D_3$" or greater than or equal to seventy five percentage of the foot length of the solder lead "dim-$D_3$", then the processing resource 704 may not generate the alert signal.

Various features as illustrated in the examples described herein may be implemented to avoid slip over of the defective solder joints from the quality check environment. Thus, the implementation of the present disclosure may provide higher confidence of socket connector's (e.g., DDRX SMT connector), as the solder joint fulfils the IPC-A-610 requirements to meet the pre-defined warranty period. Further, the present inspection method is a non-destructive quantitative method that may improve operation working efficiency and reduce failure analysis cycle time. Additionally, the present inspection method may define a quantitative metric for the X-ray inspection with objective threshold acceptance criteria versus a subjective operator judgement, thereby reducing the destructive analysis of interconnected electronic part.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   i) receiving, by a processing resource of a computing device, a first data representing side joint lengths of a plurality of solder joints measured by a first measurement machine, wherein the plurality of solder joints is formed between a solder lead in an electronic component and an electronic board;
   ii) receiving, by the processing resource, a second data representing the side joint lengths of the plurality of solder joints measured by a second measurement machine;
   iii) determining, by the processing resource, a correlation value based on a statistical analysis of a relationship between the first and second data; and
   iv) updating, by the processing resource, an algorithm used by the first measurement machine to measure the side joint lengths, based on the correlation value to reduce deviation between the first and second data, wherein the algorithm is used as a dimensional metrology in the first measurement machine to detect a defect among the plurality of solder joints.

2. The method of claim 1, wherein updating the algorithm comprises:
   determining, by the processing resource, whether the correlation value is outside a pre-defined correlation coefficient range; and
   updating the algorithm, by the processing resource, in response to determining that the correlation value is outside the pre-defined correlation coefficient range, based on the second data, wherein the correlation value is a correlation coefficient value.

3. The method of claim 1, wherein updating the algorithm comprises:
   determining, by the processing resource, whether the correlation value is outside a pre-defined coefficient of determination percentage; and
   updating the algorithm, by the processing resource, in response to determining that the correlation value is outside the pre-defined coefficient of determination percentage, based on the second data, wherein the correlation value is a coefficient of determination value.

4. The method of claim 1, wherein updating the algorithm comprises training the algorithm for measuring the side joint lengths based on the second data generated by the second measurement machine.

5. The method of claim 1, wherein updating the algorithm comprises:
   determining, by the processing resource, whether the correlation value is inside a pre-defined value,
   wherein the correlation value comprises a correlation coefficient value and a coefficient of determination value, and wherein the pre-defined value comprises a pre-defined correlation coefficient range and a pre-defined coefficient of determination percentage; and
   repeating, by the processing resource, steps i) to iii) based on another set of the first and second data in response to determining that the correlation value is inside the pre-defined value.

6. The method of claim 5, further comprising:
   determining, by the processing resource, whether the correlation value for other set of the first and second data, is outside the pre-defined value; and
   updating the algorithm, by the processing resource, in response to determining that the correlation value is outside the pre-defined value, based on the second data in other set of the first and second data.

7. The method of claim 5, further comprising:
   determining, by the processing resource, whether the correlation value for other set of the first and second data, is inside the pre-defined value; and
   in response to determining that the correlation value is inside the pre-defined value, updating, by the processing resource, the algorithm with a pre-defined threshold side joint length, wherein the pre-defined threshold side joint length is determined based on raw material measurements of a foot length and a lead width of solder lead.

8. The method of claim 7, further comprising:
   processing, by a processor of the first measurement machine, the algorithm to measure the side joint lengths of the solder joints; and
   determining, by the processor, whether to generate an alert signal indicative of the defect detected in the solder joints based on comparison of a measured side joint length of the solder joint with the pre-defined threshold side joint length.

9. The method of claim 1, wherein the first measurement machine is an X-ray machine, and wherein the second measurement machine is an optical machine.

10. A method comprising:
    detecting, by a processing resource of a measurement machine, at least one quality feature of a solder joint among a plurality of solder joints formed between a solder lead in an electronic component and an electronic board;
    analyzing, by the processing resource, the at least one quality feature to measure a side joint length of the solder joint; and
    determining, by the processing resource, whether to generate an alert signal indicative of a defect detected in the solder joint based on comparison of a measured side joint length of the solder joint with a pre-defined threshold side joint length, wherein the pre-defined threshold side joint length is determined based on raw material measurements of a foot length and a lead width of the solder lead.

11. The method of claim 10, wherein the pre-defined threshold side joint length is greater than or equal to a three times the lead width of the solder lead in the electronic component.

12. The method of claim 10, wherein the pre-defined threshold side joint length is greater than or equal to seventy five percentage of the foot length of the solder lead in the electronic component.

13. The method of claim 10, further comprising, in response to detecting the defect in the solder joint, defining, by the processing resource, a severity of the defect depending on a deviation range of the measured side joint length from the pre-defined threshold side joint length.

14. The method of claim 13, wherein the severity comprises an indicator for a process improvement in a manufacture of the plurality of solder joints or a stopover of a production environment of the plurality of solder joints.

15. The method of claim 10, wherein the measurement machine is an X-ray machine.

16. A measurement machine comprising:
    a machine readable medium that stores program instructions; and
    a processing resource operably coupled to the machine readable medium, wherein the processing resource executes the program instructions to:
        detect at least one quality feature of a solder joint among a plurality of solder joints formed between a solder lead in an electronic component and an electronic board;
        analyze the at least one quality feature to measure a side joint length of the solder joint; and
        determine whether to generate an alert signal indicative of a defect detected in the solder joint based on comparison of measured side joint length of the solder joint with a pre-defined threshold side joint length, wherein the pre-defined threshold side joint length is determined based on raw material measurements of a foot length and a lead width of the solder lead.

17. The measurement machine of claim 16, wherein each solder joint of the plurality of solder joints has a flat gull wing solder lead.

18. The measurement machine of claim 16, is an X-ray machine.

19. The measurement machine of claim 16, wherein the pre-defined threshold side joint length is greater than or equal to a three times the lead width of the solder lead in the electronic component.

20. The measurement machine of claim 16, wherein the pre-defined threshold side joint length is greater than or equal to seventy five percentage of the foot length of the solder lead in the electronic component.

* * * * *